US005172753A

United States Patent [19]

Kadle et al.

[11] Patent Number: 5,172,753
[45] Date of Patent: Dec. 22, 1992

[54] AUTOMOBILE HEATING SYSTEM

[75] Inventors: Prasad S. Kadle, Getzville; Mohinder S. Bhatti, Amherst, both of N.Y.

[73] Assignee: General Motors Corporation, Detroit, Mich.

[21] Appl. No.: 776,033

[22] Filed: Oct. 15, 1991

[51] Int. Cl.[5] .......................... B60H 3/00; F02B 43/00
[52] U.S. Cl. ........................................ 165/42; 123/528; 123/542; 237/11; 237/12.3 A; 237/2 A; 62/402
[58] Field of Search ............ 237/2 A, 12.3 A, 12.3 B, 237/11; 165/41, 42; 123/540, 528, 559.1, 573, 542, 543; 62/401, 402

[56] References Cited

U.S. PATENT DOCUMENTS

| | | |
|---|---|---|
| 2,526,103 | 4/1946 | Wood . |
| 3,080,728 | 1/1961 | Groves et al. . |
| 4,246,759 | 1/1981 | Signoret . |
| 4,262,495 | 4/1981 | Gupta et al. . |
| 4,428,718 | 1/1984 | Skinner . |
| 4,531,671 | 7/1985 | Schwenk . |
| 4,535,606 | 8/1985 | Rannenberg . |
| 4,535,839 | 8/1985 | Sacca . |
| 4,665,715 | 5/1987 | Signoret . |
| 4,703,464 | 10/1987 | Howarth et al. . |
| 4,925,091 | 5/1990 | Yanagihara et al. .......... 237/12.3 A |

Primary Examiner—Henry A. Bennet
Attorney, Agent, or Firm—Ronald L. Phillips

[57] ABSTRACT

An automobile heating system includes a turbocharger driven by the exhaust gas of an internal combustion engine and a shaft of the turbocharger is coupled to a compressor for compressing and heating ambient air to provide a heated air source for supply into the passenger compartment of the vehicle and a source of air for turbocharging the intake manifold of the automobile.

3 Claims, 2 Drawing Sheets

AUTOMOBILE HEATING SYSTEM

FIELD OF THE INVENTION

This invention relates to motor vehicle heating systems and more particularly to motor vehicle heating systems which have a heater core to heat air flow into the vehicle.

BACKGROUND OF THE INVENTION

Present day motor vehicle air conditioning systems include a heater core which draws heat from the radiator coolant of an internal combustion engine.

While suitable for their intended purpose, such heater cores do not provide instantaneous heat flow into the vehicle during winter operation. Additionally, they occupy additional space in a heating, ventilating and air conditioning (HVAC) module. The use of turbines driving a compressor for heating cabin air is known in aircraft heating systems.

Air cycle air conditioning or heating has not taken place in automobiles since high speed operation under idle conditions is not available in existing vehicles and especially in the case of internal combustion engine driven vehicles. Such prior vehicle power systems have included internal combustion engines with speed ranges from 600 rpm at engine idle conditions to 5,500 rpm during vehicle acceleration. In contrast, in the operation of turbocompressor driven aircraft air conditioning systems the components are operated in a speed range of from 30,000 to 100,000 rpm.

Air cycle refrigeration systems are used in aircraft cabin air conditioning systems. U.S. Pat. No. 4,262,495 discloses such a system wherein air is compressed in a manner to provide heated air to the aircraft cabin. The '495 patent discloses a system that draws stale air from the cabin; the air is filtered, compressed and cooled or heated in a recirculation loop. The patent does not suggest use of such air cycle cooling/heating in a system in which the power source is a high speed motive drive that receives its power from an internal combustion engine that powers an automobile. Further, there is no suggestion in the '495 patent of utilizing an air cycle heating mode to replace the heater core in the HVAC module of an automotive air conditioning system.

U.S. Pat. No. 4,665,715 discloses an air cycle cooling system proposed for use in automotive applications. It includes a drive shaft 35 for driving a compressor that compresses air that is then directed through a heat exchanger and a turboexpander 28 for cooling the air flow for use in an enclosure 30. There is no suggestion of providing a drive system that will efficiently operate the air cycle air conditioning system when an automobile is powered by a low speed internal combustion engine. Nor is there any suggestion in the '715 patent that hot compressed air from the compressor be used in a ventilating system to replace the ambient air heated by a heater core of a HVAC module in an automotive air conditioning system.

Applications of air cycle automotive air conditioning in which low speed operation are set forth in U.S. Pat. Nos. 3,686,893; 3,877,245; 3,884,664; 3,886,763; 3,886,764 and 3,886,765 by Thomas C. Edwards. The Brayton cycles shown therein have been tested by the assignee of the present invention. Test results show that the Edwards system has an inadequate air flow rate and too low an isentropic efficiency for use in commercially acceptable automotive air conditioning systems due to use of a low speed, e.g., 2500 RPM, rotary vane type compressor and expander.

SUMMARY OF THE INVENTION

According to the present invention, an automobile air conditioning system includes a low speed internal combustion engine for powering the automobile and a high speed converter which will increase the low speed (600 to 5,500 RPM) of the automobile engine to high speed (30,000 RPM to 1000,000 RPM). In the present invention, the heater core coolant is replaced as the heat source by heated ambient air from a turbocompressor. In one embodiment of the invention, the air conditioning system includes a high speed source which is driven directly by the exhaust from the internal combustion engine. The high speed drive source is operative during both engine idle speeds and engine speeds under road load conditions to provide a variable speed input which drives the turbocompressor. The turbocompressor compresses ambient air to raise its temperature and pressure. The compressed ambient air is directed across a throttling device that will reduce the pressure of the hot compressed air for discharge into the passenger compartment of a vehicle.

An object of the present invention is to eliminate the need for an engine coolant heated heater core in an automotive air conditioning system and to provide an instantaneous heat source for raising the air temperature of the passenger compartment especially on cold days.

Another object of the present invention is to eliminate such engine coolant heated heater cores by providing an automotive air conditioning system which is directly engine driven but which eliminates the need for a separate flow of engine coolant through a heater core located in heat exchange relationship with the inlet air flow to the ventilation system for an automobile.

A further object of the present invention is to provide an engine driven motor vehicle air conditioning system in which a high speed drive source includes a gear set operative under engine idle, engine acceleration and engine revolutions at road speeds and operatively coupled to an air turbocompressor for driving it in a speed range in excess of 30,000 RPM for compressing and heating air for flow into the passenger compartment of a vehicle.

A further object of the present invention is to provide an internal combustion engine driven automobile air conditioning system in which a high speed drive source includes a turbine driven by exhaust gas flow from the vehicle engine and operative during engine acceleration and engine revolutions at road speeds and directly coupled to an air compressor for compressing and heating air for flow to a throttling device for reducing the pressure of the heated air so as to produce a heated air source for the vehicle ventilating system.

BRIEF DESCRIPTION OF THE DRAWINGS

These objects, features and advantage of the present invention will become more apparent from reading the following description when taken in conjunction with the appended drawings in which.

DETAILED DESCRIPTION OF PREFERRED EMBODIMENTS OF THE INVENTION

Figure 1:
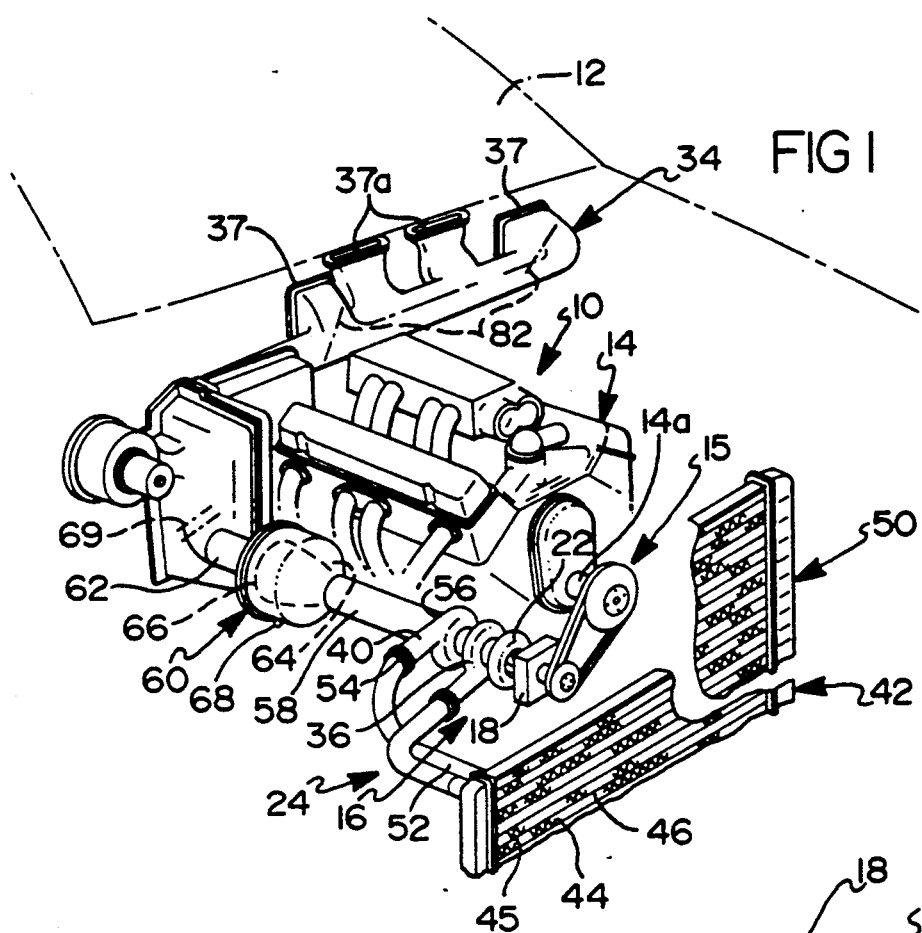
FIG. 1 is a perspective view of the vehicle heating system of the invention in an underhood location within a motor vehicle having an internal combustion engine.
Figure 2:
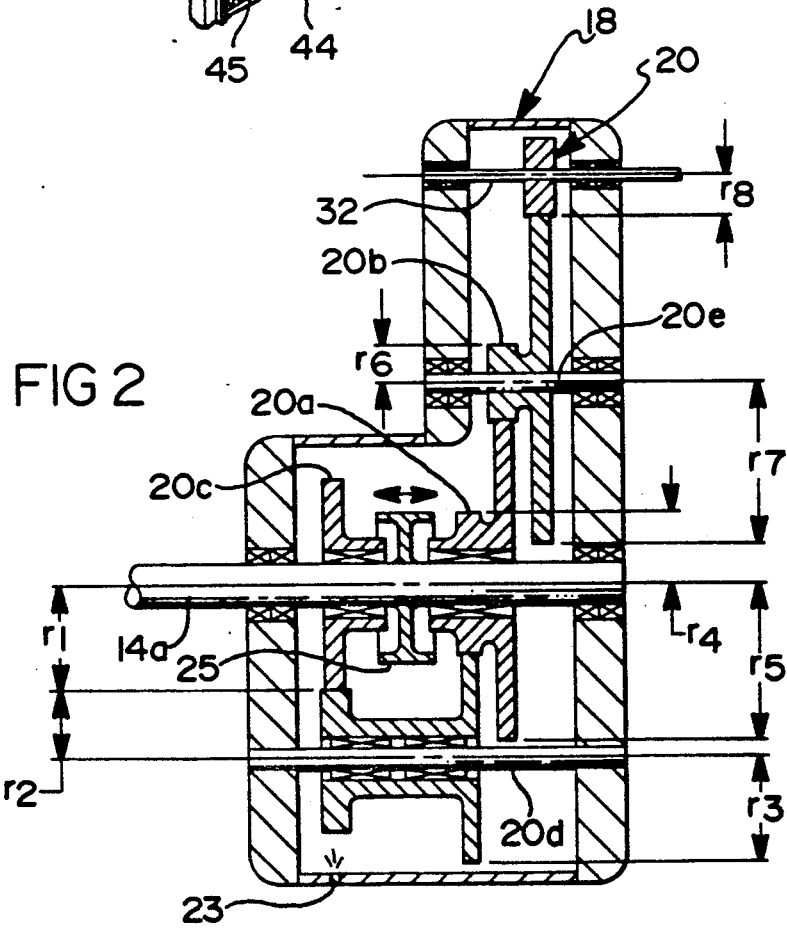
FIG. 2 is a diagrammatic view of a gear set used in an auxiliary drive in one embodiment.
Figure 3:
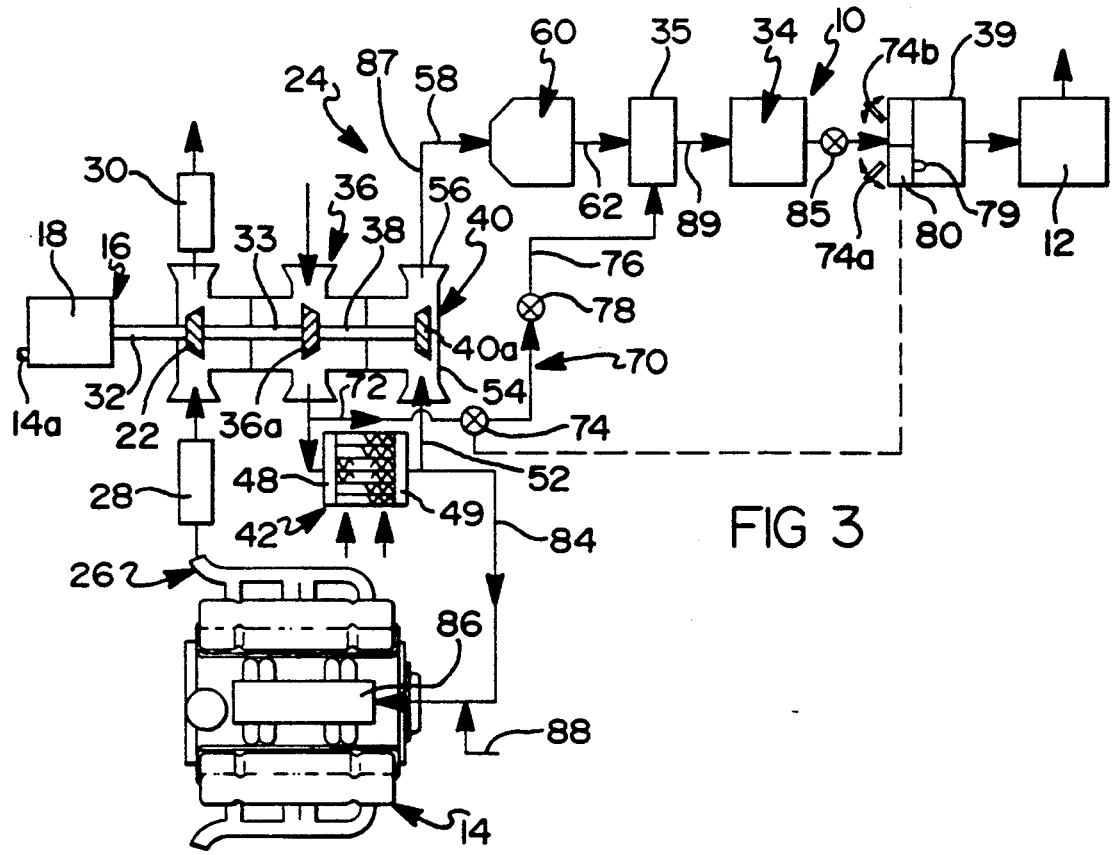
FIG. 3 is a diagrammatic representation of an embodiment of the present invention included in a air cycle air cooling system.

Referring now to FIGS. 1-3, an air conditioning system 10 is shown for a passenger compartment 12. The system 10 has a low speed vehicle drive shown as an internal combustion engine 14. The output of the engine 14 is connected through a belt pulley drive system 15 to a high speed drive source 16 including a secondary or supplemental drive 18. The supplemental drive can be a gear set 18 as shown in FIG. 2 that serves to increase the output speed of a power takeoff shaft 14a from the internal combustion engine 14 into a high speed range for reason to be discussed. The gear box 18 supplements the high speed drive of an exhaust gas turbine 22 that provides power to drive an air heating and cooling system 24. The gas turbine 22 is located in the hot exhaust gas circuit 26 of the engine 14 downstream of a catalytic converter 28 and upstream of the exhaust and muffler system 30 (see FIG. 3).

The gear box 18 includes a gear set 20 having three stages 20a-20c lubricated by a spray lubricator 23 and including a clutch 25 operative to disengage the gear set 20 under predetermined operating modes to be discussed. The gear set 20 is operative to turn a turboshaft 32 from the exhaust gas turbine 22. As shown in FIG. 3, the turboshaft 32 is connected to a compressor shaft 33 of the air cycle heating and cooling system 24. The air cycle heating and cooling system 24 includes a heating, ventilating and air conditioning (HVAC) module 34 with mixing muff box 35 and passages that direct conditioned air to appropriate outlets 37 in the passenger compartment. The air conditioning system 24 further includes a dash mounted temperature and mode controller 39 for operating the HVAC module 34 through suitable levers and controllers of the type well known to those skilled in the art.

The turbocompressor 36 has a fixed vane impeller 36a connected by a cross-shaft 38 to a turboexpander 40 having a fixed vane impeller 40a. The turbocompressor 36 and turboexpander 40 are driven at a suitable high speed under both idle and road speeds of the engine 14. A typical gear box for use in automotive applications will have a size envelope which measures about 7.5"×4.5"×4.5" and that will weigh about 5 to 15 pounds.

FIG. 2 shows the high speed gear box 18 for the mobile air conditioning system. It has three stages 20a, 20b, 20c of helical gears, all of which are spray lubricated by spray lubricator 23. The gear box has four shafts, viz., input drive shaft 14a, stationary shaft 20d, intermediate shaft 20e, and output shaft 32. Mounted on the drive shaft 14a are gears in stages 20a, 20c with radii $r_1$, $r_4$, and $r_5$. Mounted on the stationary shaft 20d are gears in stages 20a, 20c with radii $r_2$ and $r_3$. Mounted on the intermediate shaft 20e are gears in stage 20b with radii $r_6$ and $r_7$ and, finally, mounted on the output shaft 32 is the output gear for stage 20b with a radius $r_8$.

For the air conditioning system operation under idle condition, a clutch 25 mounted on the input drive shaft 14a is engaged to the bearing mounted gear with $r_1$ radius on the left. This drives the bearing-mounted gear with $r_2$ radius on the stationary shaft. The bearing-mounted gear with radius $r_3$ turns at the same RPM as the gear with radius $r_2$. The gear with radius $r_3$ drives the bearing-mounted gear with radius $r_4$ on the input drive shaft. The bearing-mounted gear with radius $r_5$ turns at the same RPM as the gear with radius $r_4$. The gear with radius $r_5$ drives the shaft-mounted gear with radius $r_6$ on the intermediate shaft. The shaft-mounted gear with radius $r_7$ turns at the same RPM as the gear with radius $r_6$. Finally, the gear with radius $r_7$ drives the gear with radius $r_8$ mounted on the output shaft which is engaged by the clutch. From this we see that the speed ratio $\omega_{idle}$ with idle attained under idle condition is $$\omega_{IDLE} = \left(\frac{r_1}{r_2}\right)\left(\frac{r_3}{r_4}\right)\left(\frac{r_5}{r_6}\right)\left(\frac{r_7}{r_8}\right) \quad (1)$$

For air conditioning system operation under down-the-road condition, the clutch 25 mounted on the input drive shaft is engaged to the bearing-mounted gear with $r_5$ radius on the right. This drives the shaft-mounted gear with radius $r_6$. The gear with radius $r_7$ turns at the same RPM as the gear with $r_6$ radius. Finally, the gear with the $r_7$ radius drives the gear with $r_8$ radius mounted on the output shaft 32. Accordingly, the speed ratio $\omega_{down-the-road}$ attained under down-the-road condition is $$\omega_{down-the-road} = \left(\frac{r_5}{r_6}\right)\left(\frac{r_7}{r_8}\right) \quad (2)$$

From equations (1) and (2), it is clear that the speed ratio is higher under idle condition than under down-the-road condition.

From the foregoing description, it is clear that the compound idler, comprised of gears with $r_2$ and $r_3$ radii, contributes to speed increase only under idle condition when the gear with $r_1$ radius is engaged by the clutch 25. Under down-the-road condition, the gear with $r_1$ radius is not engaged by the clutch. In this case, the gear with $r_4$ radius is engaged by the clutch. Under down-the-road condition, the compound idler merely spins on its bearings without contributing to any speed increase.

The advantage of such arrangements is that at idle the engine speed is increased through the gear box 18 to a speed range of from 30,000 to 100,000 RPM at which speeds the turbocompressor 36 and the turboexpander 40 can be operated to produce desired air cycle heating and cooling as will be discussed. The power transmission losses for such heating and cooling is no more than from 2 to 5% of the total power transmitted. In this range the total fuel consumption to run the air cycle air conditioning system 10 is approximately the same as that consumed in the operation of present day mechanically driven refrigerant and engine coolant heating systems used to heat and cool the air flow into the passenger compartment of an automobile.

The turbocompressor 36 is a centrifugal compressor which is operative in a high speed range of from 25,000 to 100,000 RPM in contrast to the relatively low speed operation of refrigerant compressors that are of the reciprocating or rotary swash plate or wobble plate type both of which are mechanically complex and which operate at low speeds in the range of 600 to 6,000 RPM making them unsuited as a compressor for use in a air cycle air conditioning system. In the present arrangement the impeller 36a can be selected from a wide range of diameters and be operated in a practical rotational speed range for drive by the high speed source constituted by the gear set 20 or exhaust gas turbine 22, depending upon whether the internal combustion engine 14 is operating at idle or if it is operating at speeds adequate to produce enough engine exhaust gas to power the air cycle heating and cooling system 24.

Examples of the drive speed for different sized impellers follows:

| Impeller Diameter (inches) | Impeller Rotational Speed (RPM) |
| --- | --- |
| 1 | 219,904 |
| 2 | 109,952 |
| 3 | 73,301 |
| 4 | 54,976 |
| 5 | 43,981 |
| 6 | 36,651 |
| 7 | 31,415 |
| 8 | 27,488 |

Calculations indicate that the required compression ratio of the turbocompressor 36 for an automobile air conditioning application will be in the range of 2. At this ratio, the pressure of the ambient air at the compressor outlet will be about 2 atmospheres. The temperature of the compressed air will be about 230° F. if the ambient air temperature is 100° F. In order to obtain a desirable cooling of the passenger compartment, prior to expansion of the cooling air through the turboexpander 40 the compressed air must be cooled to about 150° F. while maintaining the pressure of the compressed air at or around the 2 atmosphere range.

In accordance with the present invention, cooling is accomplished by directing the compressed air from the turbocompressor 36 through an intercooler 42. The intercooler 42 is an air-to-air cross-flow type heat exchanger located in front of a radiator 50 at the location occupied by the refrigerant condenser of present day refrigerant cooled automobile air conditioning systems. The physical size of the intercooler 42 corresponds to the size of standard refrigerant condensers. It includes a cold air side having axial passages 44 formed through air fins called air centers 45. The air centers 45 are connected to parallel tubes 46 for receiving hot compressed gas from the turbocompressor 36 and transferring the compressed gas between inlet and outlet headers 48, 49. The outlet header 49 returns the hot compressed air to the inlet of the turboexpander 40. An aftercooler with the same number of tubes and fins as found in present day condensers will lower the hot air temperature by about 100° F. with a front air cooling air flow rate comparable to that found in present day cars, e.g., at 50 mph vehicle speed, 150 $lb_m$/min. and with a conditioned air flow rate of 15 $lb_m$/min. flowing into the passenger compartment of a vehicle also comparable to that cooled by present day air conditioning systems. It should be noted that m is a subscript signifying mass to distinguish it from a force unit in pounds.

The pressure drop on the hot air side of such an aftercooler is estimated to be about 1.5 psi thereby increasing the energy loss through the intercooler upstream of the turboexpander 40. The location and use of a cross-flow type intercooler similar in size to the prior refrigerant condenser enables the large amounts of front end air to be effectively used for engine cooling purposes at an engine cooling radiator 50 located rearwardly of and in line with the intercooler 42. The radiator 50 has coolant circulated therethrough by standard water pump, radiator hoses and thermostat components, all of which are omitted from the drawings to avoid obscuring the component parts of the air conditioning system 24 of the present invention. Furthermore, the front end location of the intercooler 42 does not require location within the HVAC module so that the interface between the air conditioning system 24 of the present invention and the air flow into the passenger compartment remains essentially the same as found in present day refrigerant type air conditioning systems. A feature of the invention is the elimination of heater core, heater core hoses and temperature control valves required when coolant is used to heat the air flow into passenger compartments.

In the present invention, the air flow into the passenger compartment is from the hot air side of the intercooler 42, the cold air side being the outside cooling air flowing over the aftercooler. In order to make this possible the air conditioning system includes the turboexpander 40 in series airflow relationship with an outlet conduit 52 from the intercooler 42 as shown in FIG. 1. The outlet conduit 52 connects to the inlet 54 of the turboexpander 40 and the outlet 56 of the turboexpander 40 is connected by a conduit 58 to the inlet of a water separator 60 that is operative to provide cooled dry air flow through its outlet 62 to the HVAC module 34.

More specifically, the turboexpander 40 is mounted on the same shaft as the turbocompressor 36 and has the same high speed rotational speed as discussed above. The turboexpander 40 is operative to extract from the compressed air passing through its inlet 54 60% to 70% of the compression work required by the turbocompressor 36. As the turboexpander 40 extracts work from the compressed air directed thereto, the turboexpander 40 lowers the air temperature into a temperature range suitable for cooling a passenger compartment of an automobile to provide desired passenger comfort. Additionally the pressure in the air flow at the outlet 56 of the turboexpander 40 will be approximately atmospheric pressure, which is the desired pressure at which the conditioned air should be injected into the passenger compartment.

The water separator 60 includes a vortex generator 64 to swirl and separate water droplets from the moisture in the ambient air which condenses during the expansion process within the turboexpander 40. The separated moisture collects on a fabric coalescer 66 and the vortex generator receives the air and droplets from the coalescer 66 and centrifuges the water into a stagnant region constituting a collector/drain 68 in the bottom of the water separator 60. The cyclone type separation is about 80% to 85% efficient. Accordingly, downstream traps 69 can be provided in the HVAC module 34 if desired to remove any objectional entrained moisture in the airstream passing through the outlet conduit 62.

In accordance with the principles of the present invention, heating is provided by the air conditioning system 24 without requiring heat transfer between a heating medium such as engine coolant as presently found in systems in which a heater core is connected to the engine coolant system for providing circulation through the heater core under the control of a temperature controller that is operative to regulate flow of hot engine coolant through the tubes of the heater core. In the present invention, such heating is replaced by use of hot air generated by the turbocompressor 36. The air conditioning system thereby uses only air rather than heat transfer between air and another medium. The hot air heater is a hot air system 70 that is controlled by the dash mounted controller 39 (see FIG. 3). The hot air system 70 includes a bypass line 72 from the outlet of the turbocompressor 36. The bypass line 72 is connected to the inlet of a hot airflow control valve 74 which is actuated by a temperature control lever 74a on the controller 39 to regulate the amount of hot air flow from the turbocompressor outlet for passage through a hot air conduit 76 connected to the conduit 62 which communicates the outlet of the water separator 60 with the inlet to the mixing muff box 35 of the HVAC module 34.

A throttling device 78 is provided in the conduit 76 to reduce the pressure of the hot compressed air to just above atmospheric pressure without significantly reducing the temperature of the hot compressed air. Calculations indicate that the temperature drop would be no more than 2° to 3° F. upon such throttling. The throttling device 78 can be a simple orifice, an orifice tube or if greater control is desired it could be an electronically adjusted valve controlled by a signal from a suitable transducer 79 in a controller 80 in the dash mounted control head 39.

The HVAC module 34 comprises a set of doors, valves and ducts 82 to direct the conditioned air to the appropriate ones of the outlets 37 (see FIG. 1). The HVAC module 34 in the air cycle heating system 24 of the present invention occupies less space than a conventional HVAC found in ventilating and conditioning systems used in automobiles at present. The reduced size is attributable to the fact that the HVAC does not house the evaporator and heater core components found in existing systems.

The dash mounted controller 39 includes the temperature lever 74a and other mode control buttons or levers as desired. The controller levers or buttons are positioned to regulate the amounts of hot and cold air to be delivered into the passenger compartment through A/C, defrost, heat, bi-level, and tri-level modes. Air conditioning causes the air to flow through ducts 37 located at positions to direct the cold air flow through conduit 62 to the upper portions of the passenger compartment. The defrost mode will position the valves 82 and the valve 74 to direct heated air through dashboard mounted ducts 37a to impinge against the windshield of the vehicle. The heat mode will direct the hot air to outlets (not shown) in the lower part of the passenger compartment. The bi-level and tri-level modes will direct modulated hot and cold air through the heating and cooling ducts and in the case of tri-level through all the outlet ducts.

The air conditioning system further includes a flow rate valve 85 that is located downstream of the two separate cool air and heated air streams defined by lines 87 and 76. The cold and heated air streams 87, 76 are mixed in the muff box 35 and a mixed air stream 89 enters the HVAC module 84. The flow rate valve 85 takes the place of the multi-speed fan presently used in automobile ventilating systems to control the amount of air flow into the passenger compartment. The amount of air flow through the valve 85 is established by a suitable manually adjustable controller shown in the illustrated embodiment as a control lever 74b on the dash mounted controller 39.

In the embodiment of FIGS. 1 and 3, following cooling of the compressed air in the intercooler 42, air which is not directed into the passenger compartment can be used to supercharge the engine by connecting the outlet of the hot air side of the intercooler 42 with a return pipe 84 which has its outlet connected to the inlet manifold 86 of the engine 14. Additional make-up air can be provided by air flow through a branch intake 88 as shown in FIG. 2.

Figure 4:
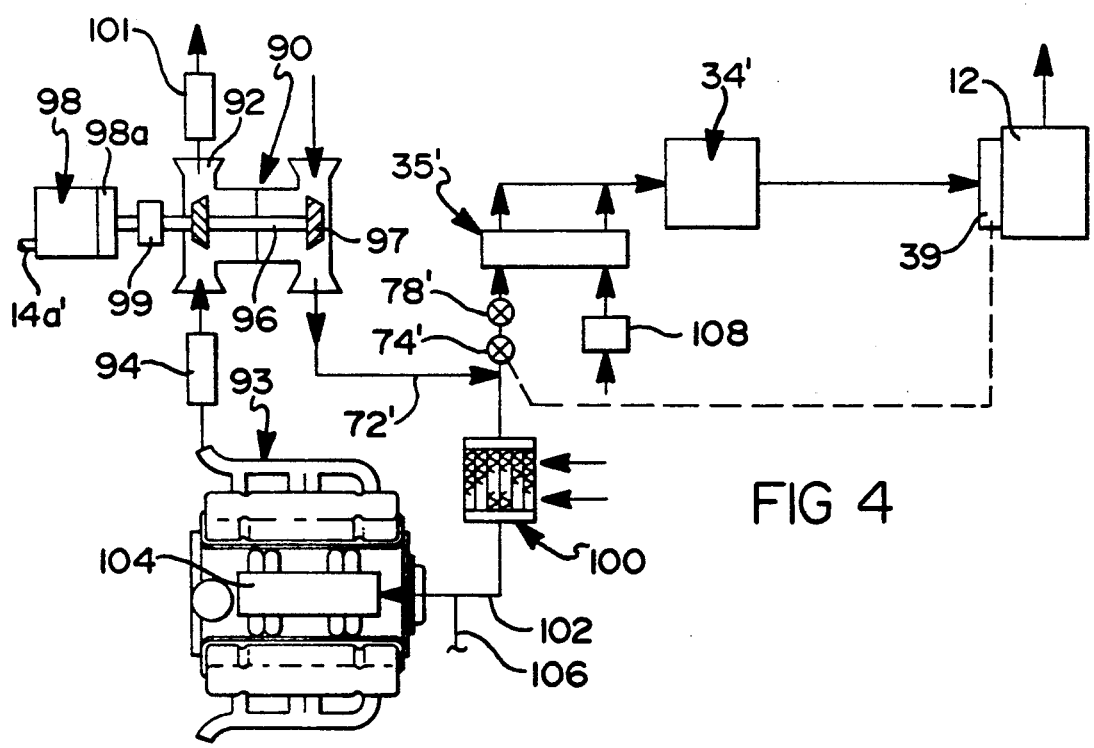
FIG. 4 is a diagrammatic representation of an engine turbo driven embodiment of the present invention.

Another embodiment of the invention is setforth in FIG. 4 in which components corresponding to those in the embodiment of FIGS. 1 and 3 are designated with the same reference numerals primed.

In this embodiment of the invention, there is no air cooling by the air conditioning system 24. The high speed drive 16 includes a turbocompressor 90 with a turbine 92 located in the hot exhaust circuit 93 from an engine 14' at a point downstream of the catalytic converter 94. The turbine 92 will receive hot exhaust gas from the exhaust circuit 93 and will rotate at a high speed within the speed ranges specified for the high speed drive in the first embodiment. The turbine 92 has a drive shaft 96 connected to a compressor 97. The turbine 92 and the compressor 97 are on the same shaft and will be operated at the same high speed to produce the desired compression cycle for producing the hot air source for passage into the HVAC module 34' as was discussed in the operation of the embodiment of the invention shown in FIGS. 1 and 3. Under idle conditions, the amount of exhaust gas for powering the turbine 92 will require a supplemental drive 98 which can be an alternator/generator and electric drive motor system including an electric motor 98a. The system is driven off the engine shaft 14a' to assist in providing a power assist of the turbine 92 under engine idle operation. As the vehicle accelerates and reaches road speeds, a clutch 99 disengages the drive system 98 such that the turbine 92 will constitute the sole drive for the turbocompressor 97 to provide a desired conditioned source of hot air for heating the passenger compartment in the same manner as in the embodiment of FIGS. 1 and 3. The exhaust from the turbine 90 will be passed through suitable tailpipe and muffler components 101.

As in the first embodiment, the hot compressed air from the compressor 97 can be directed through the hot air side of an intercooler 100 for flow through an intake pipe 102 to the intake manifold 104 of the vehicle. A branch pipe 106 in the intake pipe 102 will provide make-up air as required by the operation of the internal combustion engine. An air blower 108 is provided to direct ventilating air into the passenger compartment.

According to the present invention the use of a heater core with engine coolant flow therethrough is eliminated. The air cycle air heating system in each of the embodiments includes a high speed drive source operative under a wide range of engine speed conditions to drive a turbocompressor at speeds to assure adequate heating of air for supply to the vehicle ventilating system while further providing air for supercharging the engine. While specific embodiments are illustrated the described embodiments are merely illustrative of the invention with it being understood that the invention may be modified within the scope of the appended claims.

What is claimed is:

1. In an automobile air conditioning system having an internal combustion engine for driving the air conditioning system for supplying cooled and heated air to a passenger compartment of a vehicle through an air distributing system the improvement comprising:

motive means directly driven by the internal combustion engine for providing energy; said motive means including high speed drive means for providing an output speed greater than the output speed of the internal combustion engine;

said air conditioning system including an air compressor and an air turboexpander and an intercooler therebetween; said air compressor operative to compress and heat air for flow to the air distributing system for heating the passenger compartment and for flow to the intercooler for removing energy from ambient air and said air turboexpander operative to expand the ambient air cooled by the intercooler for providing a cool air source for the air distributing system;

said intercooler having a hot air side and means for connecting said hot air side of said intercooler to the intake manifold of said engine for supercharging an air intake thereto.

2. In an automobile air conditioning system having an internal combustion engine for driving the air conditioning system for supplying cooled and heated air to a passenger compartment of a vehicle through an air distributing ventilation system the improvement comprising:

motive means directly driven by the internal combustion engine;

conditioning means operated by said motive means to heat an airstream without passing the airstream in heat transfer relationship to a heating medium other than air; said conditioning means including an air compressor for directly compressing and heating air for distribution through the air distributing ventilation system, an air turboexpander and an intercooler therebetween having a cold air side and a hot air side; said air compressor operative for compressing air for flow to the intercooler for removing energy from ambient air and means for directing the ambient air to said air turboexpander and to the intake manifold of said internal combustion engine to provide an air stream for expansion by said turboexpander for providing a cool air source for the vehicle air distributing ventilation system and an air stream for direct flow to said intake manifold for supercharging the internal combustion engine.

3. In an automobile air conditioning system having a drive engine for powering the vehicle and for driving the air conditioning system for supplying cooled and heated air to a passenger compartment of a vehicle through an air distributing ventilation system the improvement comprising:

motive means directly driven by the drive engine;

conditioning means operated by said motive means to cool an airstream without passing the airstream in heat transfer relationship to a heating medium other than air; said conditioning means including an air compressor, an air turboexpander and an intercooler therebetween; said air compressor operative for compressing and heating air; means connected to the outlet of said air compressor for forming a heated air stream for distribution into the passenger compartment of a vehicle; means for directing compressed air from the compressor for flow to the intercooler for removing energy from ambient air and said air turboexpander operative to expand the ambient air cooled by the intercooler for providing a cool air source for the vehicle air distributing ventilation system; and means bypassing said turboexpander including means for reducing pressure in said heated airstream prior to passage thereof into said passenger compartment.

* * * * *